A. HAMMOND.
DEVICE FOR USE IN TRUING CONNECTING RODS.
APPLICATION FILED OCT. 14, 1918.
1,333,172.
Patented Mar. 9, 1920.
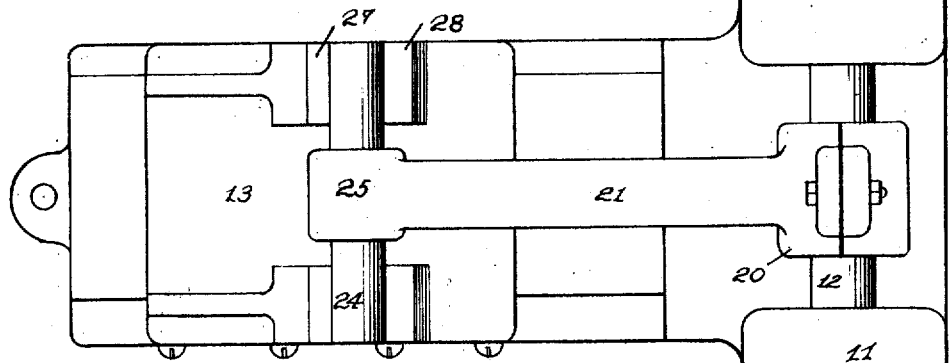
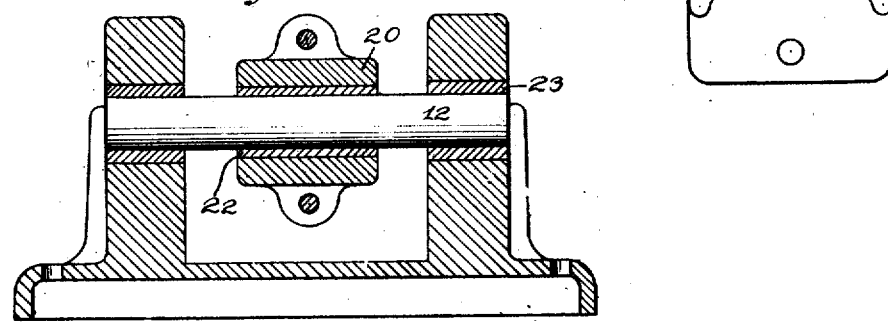
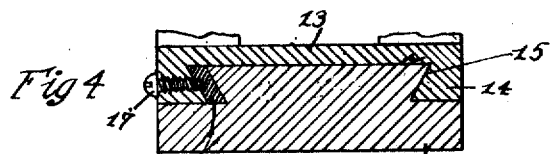
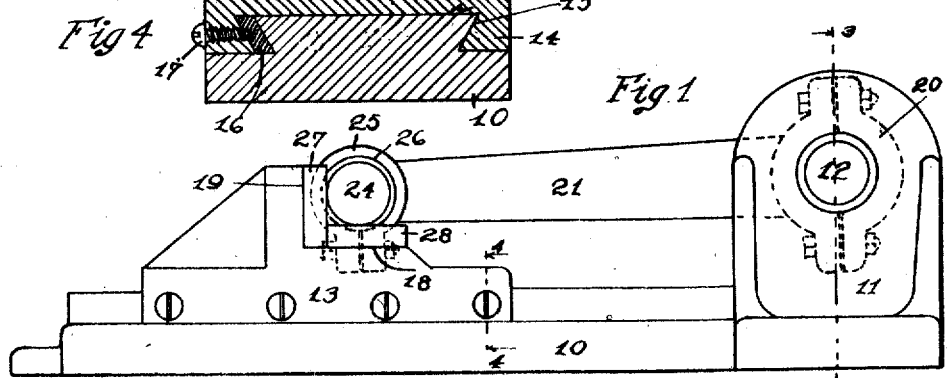
Witness
Lynn Latta
Inventor
Emil Hammond

UNITED STATES PATENT OFFICE.

AMIL HAMMOND, OF BOONE, IOWA.

DEVICE FOR USE IN TRUING CONNECTING-RODS.

1,333,172.   Specification of Letters Patent.   Patented Mar. 9, 1920.

Application filed October 14, 1918. Serial No. 257,927.

*To all whom it may concern:*

Be it known that I, AMIL HAMMOND, a citizen of the United States, and a resident of Boone, in the county of Boone and State of Iowa, have invented a certain new and useful Device for Use in Truing Connecting-Rods, of which the following is a specification.

The object of my invention is to provide a device of simple, and inexpensive construction, whereby connecting rods may be tested for finding defects therein, so that the connecting rods may then be straightened for making the axes of the journals of the opposite ends of the connecting rods correctly parallel with each other.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a device embodying my invention, with a connecting rod installed thereon.

Fig. 2 shows a top or plan view of the same.

Fig. 3 shows a transverse, vertical, sectional view taken on the line 3—3 of Fig. 1; and Fig. 4 shows a transverse, vertical, sectional view taken on line 4—4 of Fig. 1.

In the accompanying drawings I have used the reference numeral 10 to indicate generally a solid base which may be firmly mounted on a bench or other support. At one end of the base is a pair of spaced upright members 11 forming journals for a shaft 12.

At the other end of the base 10 there is mounted a carriage 13 for longitudinal sliding movement with relation to the base.

The carriage 13 has at its opposite sides guide members 14 adapted to coact with a guide member 15 on the base 10 and a guide strip 16 respectively.

The parts are of such material that the working of the carriage 13 will be very true.

In one of the carriage members 14 is mounted a series of screws or the like 17 by which the carriage may be locked in any position of its sliding movement. The carriage 13 is provided with laterally spaced, horizontal shoulders or tables 18, and just rearwardly thereof with vertical shoulders 19.

In the use of my improved device, one journal 20 of a connecting rod 21 is mounted on the shaft 12 which is removable, and is snugly fitted thereto by means of hardened steel bushings 22.

I use a great variety of these bushings which are of the same internal diameter to fit the shaft 12, but have different outside diameters for fitting different connecting rod bearings.

After the proper sized bushing 22 has been placed in position the shaft is mounted in position, as illustrated in Figs. 2 and 3. Steel bushings 23 are placed on the outer ends of the shaft 12.

A shaft 24 is provided through the other journal 25 of the connecting rod 21 and is snugly fitted thereto by means of a steel bushing 26.

A great variety of the steel bushings 26 are used, all of the same internal diameter, but of different external diameters so as to fit different connecting rods.

After the proper bushing has been inserted in the journal 25 and the journal 25 has been properly fitted to the shaft 24, there is placed adjacent to each shoulder 19 a vertically faced, hardened steel plate 27 and on each table 18 a similar plate 28.

It will be understood that the plates 27 and 28 are always fitted, so that the surface of the plate 27, adjacent to the shaft 24, and the upper surface of the plate 28 are always exactly at a right angle with each other and with the true central axis of the journal 20.

If the connecting rod 21 is then swung from raised position downwardly until the shaft 24 is adjacent to said plates 27 and 28, it will be obvious that if one end of the shaft 24 engages one of the plates 28, while the other does not, then the axis of the journal 25 is not parallel with the axis of the journal 20, and the workman will be able to readily ascertain what adjustment of the connecting rods should be had.

Similarly, if one end of the shaft 24 engages one of the plates 27, and the other end of the shaft 24 extends spaced from the other plate 27, it will be seen that the connecting rod is not true, and the workman will be able to know what to do to true it.

It will be obvious that the carriage 13 may be readily adjusted longitudinally of the device for adjusting the device for use with connecting rods of different lengths.

The operation of my device and the advantages thereof are largely obvious from the foregoing description.

With it the defects in connecting rods, due to the fact that the axes of the journals thereof are not parallel, may be readily and easily ascertained, and the nature and degree of the defects can be accurately determined, thus making it possible for the workman to know exactly what to do to correct the defect.

Some changes may be made in the construction and arrangement of the parts of my improved device without departing from the essential spirit and purpose of my invention, and it is my intention to cover by this application any modified forms of structure or use of mechanical equivalents, which may be reasonably included within the scope of my claims.

I claim as my invention:

1. In a device of the class described, a base, having at one end a pair of spaced journals, and having at the other end a slidable carriage, means for locking the carriage in various positions of its sliding movement, said carriage having a pair of spaced horizontal tables, and a pair of laterally spaced vertical shoulders, plates mounted on said shoulders and tables with their outer surfaces exactly parallel with the axes of said journals, a shaft designed to fit in said journals, a bushing for said shaft designed to fit in a journal of a connecting rod, a second shaft designed to rest adjacent to said plates, and a bushing thereon designed to fit the other journal of a connecting rod.

2. In a device of the class described, a base, having a pair of spaced, alined journals, a carriage mounted on said base and adapted for movement toward and from said journals, said carriage having spaced uprights presenting surfaces lying in the same plane which is parallel with the axis of said journals and presenting other surfaces arranged in a common plane at right-angles to said first named plane and also parallel with said journal axis.

Des Moines, Iowa, September 27, 1918.

AMIL HAMMOND.